United States Patent
Kagami et al.

(10) Patent No.: US 6,707,634 B2
(45) Date of Patent: Mar. 16, 2004

(54) CONTROL METHOD AND APPARATUS FOR REDUCING THE EFFECTS OF HARD DISK CONTAMINATION

(75) Inventors: Naoyuki Kagami, Fujisawa (JP); Masayuki Kanamaru, Fujisawa (JP); Shunichiroh Ohta, Machida (JP); Akira Tokizono, Fujisawa (JP); Toshihiko Tsunokawa, Sagamihara (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 233 days.

(21) Appl. No.: 09/950,465

(22) Filed: Sep. 10, 2001

(65) Prior Publication Data

US 2002/0067562 A1 Jun. 6, 2002

(30) Foreign Application Priority Data

Sep. 11, 2000 (JP) ......................................... 2000-275184

(51) Int. Cl.[7] ........................... G11B 33/14; G11B 21/02
(52) U.S. Cl. ...................... 360/75; 360/97.02; 360/128
(58) Field of Search ............................. 360/31, 53, 75, 360/128, 71, 78.01, 78.06, 97, 237, 97.02; 369/71

(56) References Cited

U.S. PATENT DOCUMENTS 5,461,521 A * 10/1995 Ito et al. ........................ 360/75
6,252,742 B1 * 6/2001 Kameyama .................. 360/237

\* cited by examiner

*Primary Examiner*—Andrew L. Sniezek
*Assistant Examiner*—Daniell L Negron
(74) *Attorney, Agent, or Firm*—Robert B. Martin; Bracewell & Patterson, L.L.P.

(57) ABSTRACT

A method and apparatus for use with a rotating storage device. The rotating storage device includes a storage medium driven to rotate, a head for reading and writing information on the storage medium and a ramped loading mechanism in which the head is stored. In accordance with the method of the present invention, the head is loaded from the ramped loading mechanism onto the storage medium. Next, location information stored in the storage medium via the head is read. A location of the head is then retained for a predetermined period above a track of a region other than a valid storage region of the storage medium after successfully reading the location information.

6 Claims, 6 Drawing Sheets

CONTROL METHOD AND APPARATUS FOR REDUCING THE EFFECTS OF HARD DISK CONTAMINATION

BACKGROUND OF THE INVENTION

1. Technical Field

The present invention relates to a rotating storage device and a control method thereof, and more particularly relates to a control technique by which contamination in a hard disk unit or for a write error caused by contamination etc. and the negative effects resulting therefrom are reduced.

2. Description of the Related Art

If contamination such as dust exists in a hard disk unit, adhesion of contamination onto a read/write head may cause unstable flight of the head. Contamination adhered on a magnetic disk medium in the hard disk unit may also cause adhesion of the contamination onto the head or an error in information read/write on the magnetic disk.

Therefore, in processes of assembling the hard disk unit, anti-contamination measures, such as sufficient cleaning of parts, assembly in a clean environment (clean room, etc.), and adopting an automated processing by mechanization are taken. However, the nature of many hard disk assembly processes do not lend themselves to automation so that manual, dust-generating processes may not be eliminated. Also, insufficient cleaning of parts cannot be avoided because of unequal process capabilities. Consequently, a certain level of contamination shall inevitably occur.

Accordingly, the conventional art includes measures for various types of contamination or defects and growth of defects caused by contamination. For example, Japanese Patent (Laid-Open) No. 2000-156051 discloses the art to judge that adjacent defect registration is required for a read error recoverable by offset read and perform the adjacent defect registration of a sector in the reverse direction of said sector and offset direction. Thus, the minimum defect can be registered before a defect grows by performing adjacent defect registration after detecting a read error, and high data reliability can be obtained with the minimum number of defective sectors.

As another example, Japanese Patent (Laid-Open) Heisei No. 5-28675 discloses the art to use a magnetic head lift mechanism to make a magnetic head contact a magnetic disk immediately before the start of rotating the magnetic disk, then rotate the magnetic disk in this state. Said report indicates that minute dust can be removed by making the magnetic head contact the magnetic disk.

As a further example, Japanese Patent (Laid-Open) Heisei No. 5-54577 discloses the art to stop or slow down rotation of the spindle while the magnetic head is not performing a read/write operation, then make the magnetic head contact the magnetic disk. The report says that minute dust can be removed by making the magnetic head contact the magnetic disk.

Japanese Patent (Laid-Open) Heisei No. 6-203503 discloses the art to contrive loading and unloading periods focusing on changes in the tangential force of head contact to the contact start stop (CSS) in order to prevent the disk from being damaged and remove dust adhered on the head rail surface. Both prevention of a disk damage and dust removal are enabled by controlling load and unload operations to be performed while the number of disk rotations is few.

As a further example, Japanese Patent (Laid-Open) Heisei No. 2000-90612 discloses the art to remove dust from a contact pad by controlling numbers of disk rotations at load and unload operations for controlling the pitch angle of the head slider to efficiently remove dust adhered and accumulated on the contact type head slider.

However, the recent improvement of storage density requires more detailed measures to defect on a disk surface and defect growth. Even levels of contamination and defects out of matter with conventional arts do matter with the hard disk unit enabling high storage density. All measures for the contamination provided by conventional arts are to make the head contact the magnetic disk medium, and are not appropriate for the hard disk unit of high storage density designed on premise of higher storage density. Contact between the head and disk may cause new contamination.

For the art described in above-described Japanese Patent (Laid-Open) Heisei No. 2000-156051, a specific result can be expected for defect growth, but no measure is taken for an existing defect and only a passive measure such as not to use peripheral storage area assuming that they are defective sectors is taken.

SUMMARY OF THE INVENTION

It is therefore one object of the invention is to provide the art to remove contamination without generating new contamination by contact between the head and disk.

It is a further object of the invention is to improve write reliability around a possible defect to effectively use the storage surface of the magnetic disk medium.

It is a further object of the invention is to improve write reliability without deteriorating the performance of write operation.

A method and apparatus for use with a rotating storage device are disclosed herein. The rotating storage device includes a storage medium driven to rotate, a head for reading and writing information on the storage medium and a ramped loading mechanism in which the head is stored. In accordance with the method of the present invention, the head is loaded from the ramped loading mechanism onto the storage medium. Next, location information stored in said storage medium via said head is read. A location of the head is then retained for a predetermined period above a track of a region other than a valid storage region of said storage medium after successfully reading the location information.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 depicts a side view of nearby peripheral areas on a disk, wherein FIG. 3(a) shows a state in which track following is performed on a head to −128 cylinder, and wherein

DETAILED DESCRIPTION OF THE PREFERRED EMBODIMENT

The hard disk unit of the invention includes a ramped loading mechanism, wherein tracks are followed around the disk outside valid storage areas for a specified period after the head is loaded from the ramped loading mechanism onto the magnetic disk medium. It can be observed by those skilled in the art that contamination often adheres on the head after being loaded from the ramped loading mechanism. The contamination and resultant unstableness of head flight are assumed cooperatively to rub the contamination onto the surface of the magnetic medium. A temperature on the surface of the magnetic medium onto which the contamination is deposited rises and magnetically-stored information may be lost.

Because, in accordance with the method of the present invention, the head is located on an area on the disk outside valid storage areas immediately after being loaded; the problem of data loss resulting from contamination is reduced. In addition, because track following is performed on outer circuits of the disk for a certain period, the head flight can be stabilized during the track following. Furthermore, much contamination can be blown off by air flow pressure generated during track following. The present invention thus removes contamination immediately after loading from the ramped loading mechanism and avoids the problem of data loss caused by contamination. Furthermore, the head flight is stabilized.

The invention also encompasses repeat moving the read/write head to the inside and outside of the disk on outer circuits of the disk after the track following on the outer circuits. The speed at which the head moves to the outside can be increased to greater than, preferably, a several times over the speed of moving to the inside (i.e., the head is slowly moved to the inside and swiftly moved to the outside). In this manner, contamination on outer portions of the disk can be swept off the disk surface. Because a filter for trapping contamination is usually installed nearby outer circuits of the disk, contamination is effectively trapped, and level of contamination in the hard disk unit can be reduced. Such a sweep off operation may induce a vibration in the horizontal direction of the head. Contamination adhered on the head can effectively be removed by the air flow pressure generated by disk rotation and the horizontal vibration.

An additional feature of the present invention verifies write operation under several circumstances. The first circumstance occurs during a specific period immediately after the head is loaded. Based on the experiment and study, the head flight is not stabilized for a certain period after the head is loaded. This period may be, for example, several seconds. The second circumstance under which the integrity of a write operation may be verified is when there exists a defect adjacent to the track including a sector onto which write has been performed. Based on experimentation and study, this circumstance may result in the head colliding with a nearby defect resulting in head flight instability. Such a collision is particularly likely when, for example, a data write operation is performed with respect to a sector of a track adjacent to a defective track. Defect occurrences can be determined by referring to a defect list.

The third circumstance under which the integrity of a write operation may be verified is when the head flight is judged to be unstable from a signal input from the head. An analog signal input from the head is amplified by a preamplifier and then converted into a digital signal by a read/write channel. At this time, the input signal is converted into digital after its amplitude is made constant by an automatic gain circuit. Stability of the head can be judged from dispersion of an obtained gain value of the automatic gain circuit. Dispersions in a normal state are measured beforehand, and are stored in a dispersion table. Then, a dispersion value at write operation and a dispersion value stored in the table are compared, and if the former dispersion value exceeds a specified threshold value, the head flight is judged to be unstable. In addition, because a dispersion value depends on a disk diameter, the disk can be divided into appropriate areas and a dispersion value of each area can be stored.

The invention encompasses a verification operation when the above-described circumstances occurs. The verification operation entails reading the written data and comparing it with the original write data to determine whether the two data items are identical or not. If they are identical, success of write can be confirmed. If not, the write operation is repeated. Then, the write and verification operation is repeated until the data is written correctly. The ratio of cycles required for the verification operation against entire write operation is very small resulting in minimal performance deterioration for write operations.

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. Although, the present invention will be described herein in terms of a particular system and particular components, one of ordinary skill in the art will readily recognize that this method and system will operate effectively for other components in a data storage system.

Figure 1:
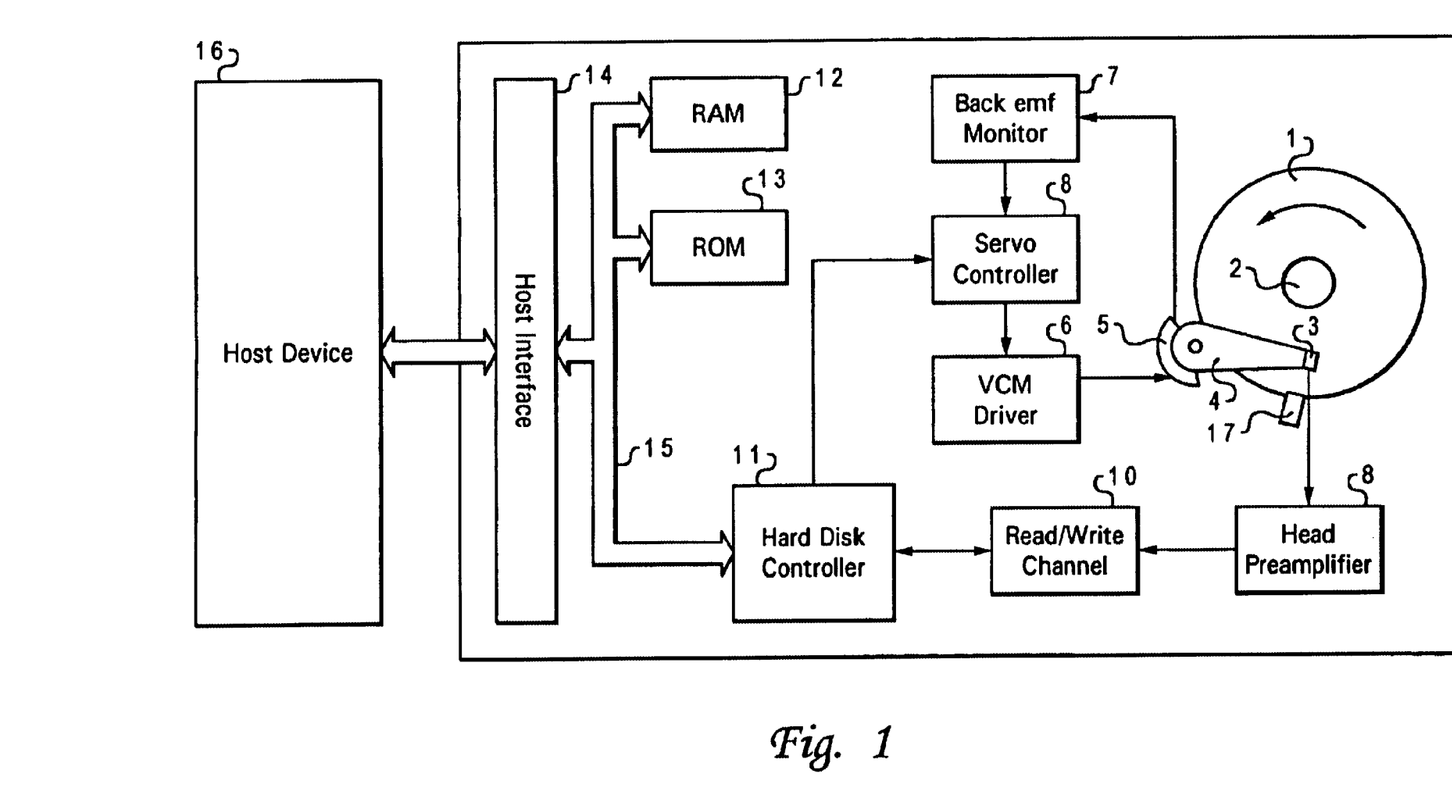
FIG. 1 depicts a block diagram of an exemplary hard disk unit in accordance with one embodiment of the present invention.

With reference now to the figures wherein like reference numerals refer to like and corresponding parts throughout, and in particular with reference to FIG. 1, there is depicted a block diagram of an exemplary hard disk unit in accordance with one embodiment of the present invention. The hard disk unit comprises: disk 1 (magnetic storage medium) on which information is magnetically stored; spindle motor 2 for driving disk 1 to rotate; magnetic head 3 for storing information onto disk 1 or reading stored information; arm 4 supporting magnetic head 3; and voice coil motor 5 (actuator) for driving arm 4. Voice coil motor 5 is driven by VCM driver 6, and the reverse electromotive force of voice coil motor 5 is monitored on the back emf monitor 7. VCM driver 6 is controlled by support controller 8.

An analog output from head 3 is amplified by head preamplifier 9 and input to read/write channel 10. In read/write channel 10, the analog signal from head 3 is adjusted to a specific amplitude by the automatic gain circuit and converted into a digital signal, then sent to hard disk controller 11 as read or write data. In addition, a gain value of the automatic gain circuit can be fetched from read/write channel 10, as will be described in further detail herein below.

Hard disk controller 11 controls the entire hard disk unit. For example, hard disk controller 11 receives a servo signal from read/write channel 10, then outputs a driver signal to VCM driver 6. Alternatively, hard disk controller 11 receives a command such as a write request and sends a read or write gate to read/write channel 10 to control read or write operation.

Hard disk controller 11 is connected to a random access memory (RAM) 12, a read only memory (ROM) 13, and a host interface 14 via a bus 15. Host interface 14 interfaces a host device 16. A program processed by the microprocessor unit in hard disk controller 11 is stored in ROM 13. A program for controlling the hard disk unit, for example, is loaded from magnetic storage medium 1 into RAM 12. Alternatively, RAM 12 functions as a buffer for data input from and output to the hard disk unit or as a storage area of a defect list or a dispersion table described herein below.

The hard disk unit in the described embodiment includes a ramped loading mechanism 17. When disk 1 is in a stopped state, head 3 is stored in ramped loading mechanism 17. By adopting ramp loading mechanism 17, durability to a vibration, shock and other mechanical hazard may be improved.

Figure 2:
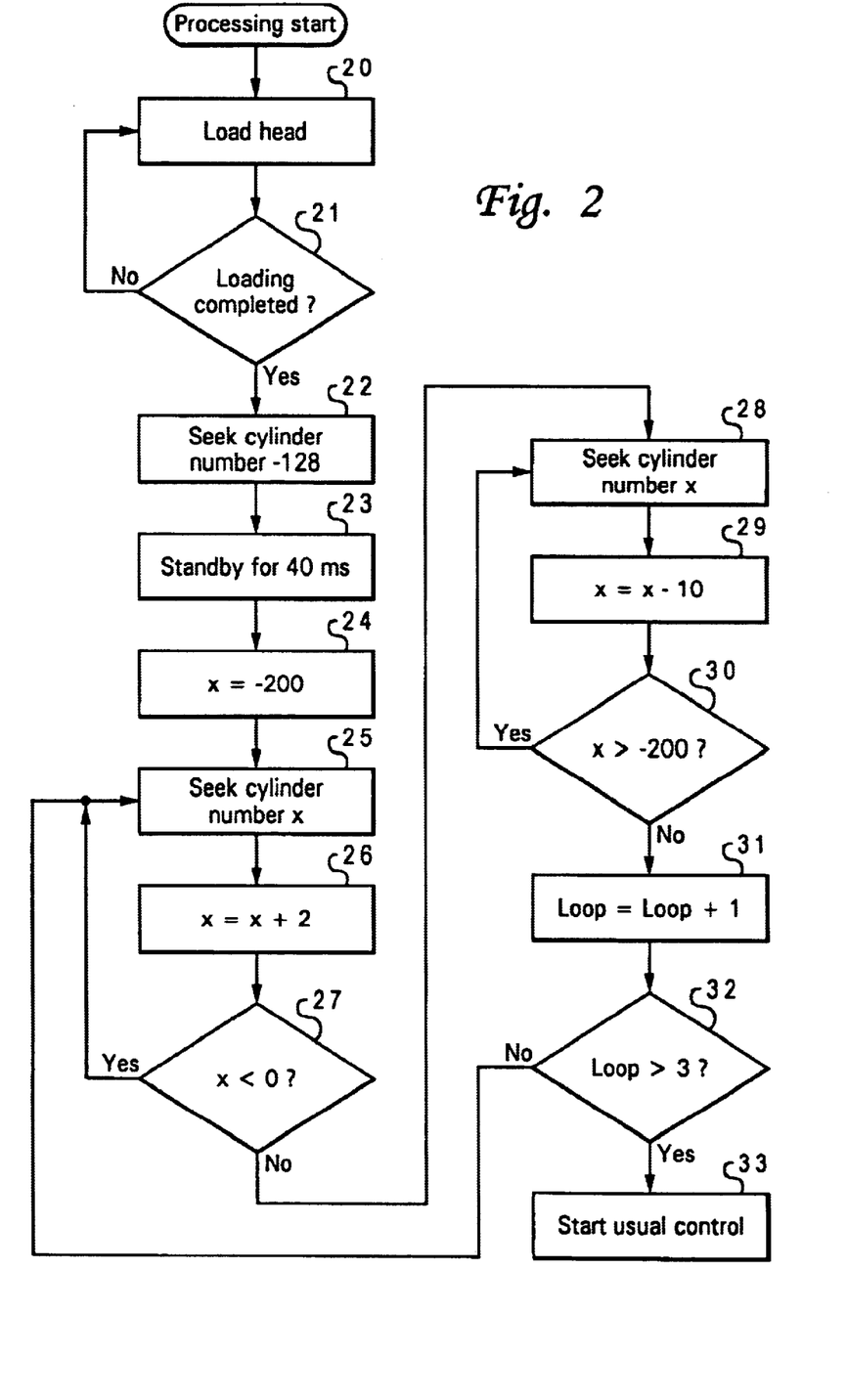
FIG. 2 is a flowchart illustrating a hard disk control method in accordance with one embodiment of the present invention.

Referring to FIG. 2, there is depicted a flowchart showing an exemplary control method for a hard disk unit in accordance with one embodiment of the present invention. Processing is started by turning on the power or starting the hard disk unit by releasing it from sleep mode or other means. From a stopped state, disk 1 is driven to rotate by spindle motor 2. When rotations of disk 1 reaches a specified rotational speed, head 3 is loaded onto disk 1 (Step 20). Because head 3 is stored on ramped loading mechanism 17 when disk 1 has stopped rotating, the loading step is executed by moving head 3 from ramped loading mechanism 17 to disk 1 in a rotating state. During this loading, a back electromotive force (EMF) monitor 7 monitors an output EMF from voice coil motor 5, and movement of arm 4 can be controlled so that head 3 gently moves onto disk 1. Movement of arm 4 is controlled by driving voice coil motor 5 using a driving current generated by a VCM driver 6 when it receives a signal from a servo controller 8.

A servo pattern representing location information for head 3 as it moves onto disk 1 is determined. The servo pattern is written on disk 1 beforehand. When the servo pattern is appropriately read, a location of head 3 can be confirmed. Completion of loading head 3 is judged by confirming that reading the servo pattern is successful (Step 21). Servo pattern reading is continuously tried until loading is completed.

When loading head 3 is judged to be completed, a seek is performed for the cylinder having cylinder number x=−128 starts (Step 22). After head 3 reaches the −128 cylinder, the cylinder is followed by the head over a specified period of 40 ms, for example (Step 23).

In the present description, cylinder numbers x are assigned in ascending order from radially outer regions to inner regions of disk 1 such that inner regions of the disk have assigned numbers greater in value that those assigned to outer regions. However, it is not the outmost regions that is designated cylinder number 0. Instead a cylinder located somewhat inner from the outmost circuit of the disk is designated cylinder 0. In accordance with one embodiment of the present invention, regions on cylinders with number 0 and greater are valid storage areas utilized by a user or reserved by the system for future use. Areas on cylinders with numbers less than 0 are areas on outer regions of the disk, and are not used for data storage operations. The −128 cylinder exits in an area around the disk.

Figure 3A:
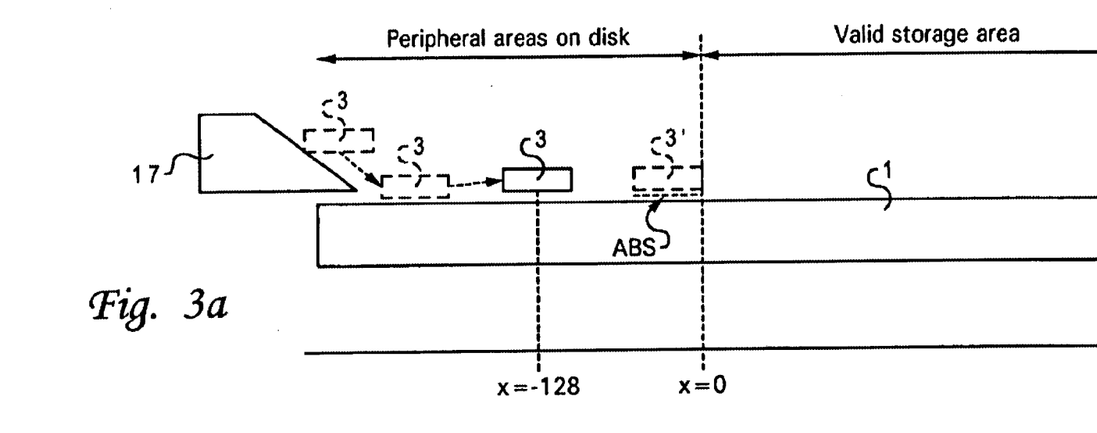
Figure 3B:
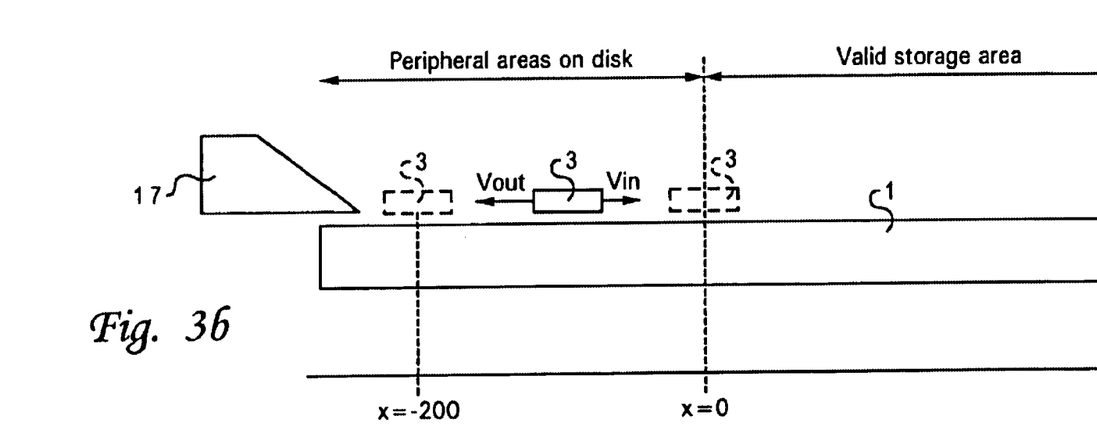
FIG. 3(b) shows a state in which a head is performing a sweep off operation.

With reference to FIG. 3(a), there is illustrated a side view of magnetic storage medium 1 showing track following on head 3 to −128 cylinder. The loading of head 3 from the ramped loading mechanism is sequentially depicted. The right side of magnetic storage medium 1 (central part of magnetic storage medium 1) is omitted.

As shown in the figure, head 3 follows to the track contained in the cylinder of X=−128 in areas around the disk (area other the valid storage areas). In addition, magnetic storage medium 1 may comprise multiple disks with heads 3 located on both sides of disks. As utilized herein references to read/write heads "above a track," means that the heads are positioned with specific distances in the normal line direction from the surface of the magnetic storage side on magnetic storage medium 1. That is, locations of head 3 and magnetic storage medium 1 are relative, and "above a track" or "over a track" indicating the location of the head includes "downwards", "sideward" and "oblique direction" when the magnetic storage side is facing downwards, sideward or in an oblique direction, and a gap scheduled by design originally exists between the head and storage side.

By track following to areas around a valid storage area on a disk over a specified period, e.g., 40 ms, after head 3 is loaded, contamination can be blown off head 3 by air flow pressure generated from rotation of the disk. Specifically, according to the findings of the inventors, much contamination often adheres to head 3 immediately after being loaded from ramped loading mechanism 17. In such a case, a substantial amount of contamination can be removed from head 3 during the initial loading stage by following tracks in areas around the disk immediately after loading. As a result, the influence of contamination in subsequent operations can effectively be controlled and the write reliability can be improved. In addition, track following is performed in areas around the disk so even if contamination adhered on head 3 is rubbed onto the magnetic storage side on disk 1, there is no possibility of data loss because areas around the disk are not used to store data. Furthermore, according to the opinion of the inventors, flight of head 3 immediately after being loaded is comparatively unstable. Therefore, track following for a specific period immediately after loading acts to stabilize head flight in an early stage. This processing enables subsequent operations be performed in a stable head flight state, and contributes to improvement of write reliability.

Although an example of track following to −128 cylinder is described herein, following to cylinders in other outer areas on the disk may be performed within the spirit and scope of the present invention. However, in a preferred embodiment the track following is performed at a location in which the air bearing surface (ABS) of head 3 does not hang over 0 cylinder in the innermost region of areas around the disk. An alternate head 3' shows track following on the innermost areas on the disk. The inventors experimentally recognize that much contamination is accumulated in areas around the ABS of head 3. Even for considerable contamination accumulation in areas on the outmost circuit of the ABS, the contamination is not adhered by rubbing on the track area located on 0 cylinder as long as the aforementioned condition is satisfied. Therefore, data storage areas can be protected completely. The outmost circuit of areas around the disk on which track following by head 3 is enabled is determined in consideration of danger of collision to ramped loading mechanism 17.

Returning to FIG. 2, following Step 23, −200 is specified as cylinder number x (Step 24) to start a seek operation on cylinder number x (Step 25). Cylinder number −200 is the outmost circuit of disk 1 on which head 3 determined in consideration of danger of collision to ramped loading mechanism 17 can be sought. Although cylinder number −200 is utilized in the exemplary embodiment, other numbers corresponding to differing track densities, may be utilized without departing from the spirit or scope of the present invention.

Next, x is incremented by 2 (Step 26) to determine if it is less than 0 (Step 27). If x is less than 0, control returns to Step 25 and seek on x cylinder is started. That is, if the target cylinder of following by head 3 is in an area around the disk, head 3 is moved toward inner circuits of disk 1 at a speed corresponding to increment by 2.

When x is determined to be 0 in Step 27, that is, when the target cylinder of head 3 enters a valid storage area, the process proceeds to Step 28 and seek on x cylinder. Then increment of x is specified to −10 (Step 29) to determine if x is greater than −200 (Step 30). If x is greater than −200, a seek on x cylinder is initiated (Step 28). That is, head 3 is moved toward outer circuits of disk 1 at a speed corresponding to increment of −10 this time. The moving toward outer circuits continues until the target cylinder search reaches −200 cylinder.

Referring again to FIG. 3(a), head 3 is controlled within the limit of cylinder 0 in the inner circuit direction is and the limit of cylinder −200 in the outer circuit direction, and moves between these limits to the inner circuit direction at a speed of Vin, and to the outer circuit direction at a speed of Vout. Speed Vin corresponds to cylinder increment by 2 and speed Vout corresponds to cylinder increment by 10. That is, head 3 moves slowly toward inner circuits and moves faster toward outer circuits.

Such head 3 operation is a seep off operation toward outer circuits and acts to sweep contamination off peripheral areas on the disk toward the outer circuit direction of the disk. This operation also gives a vibration in a horizontal direction to head 3 itself. This vibration shakes contamination off head 3. It is expected to exhibit the effect that contamination may be removed more surely from cooperative effect of said vibration and air flow pressure generated by rotation of disk 1.

Increase variable Loop for 1 in Step 31 to determine whether Loop is 3 or greater (Step 32). If Loop is 3 or less, return to Step 25 and perform said sweep off operation. Such sweep off operation shall be repeated three times. After this, start usual control (Step 33).

Figure 4:
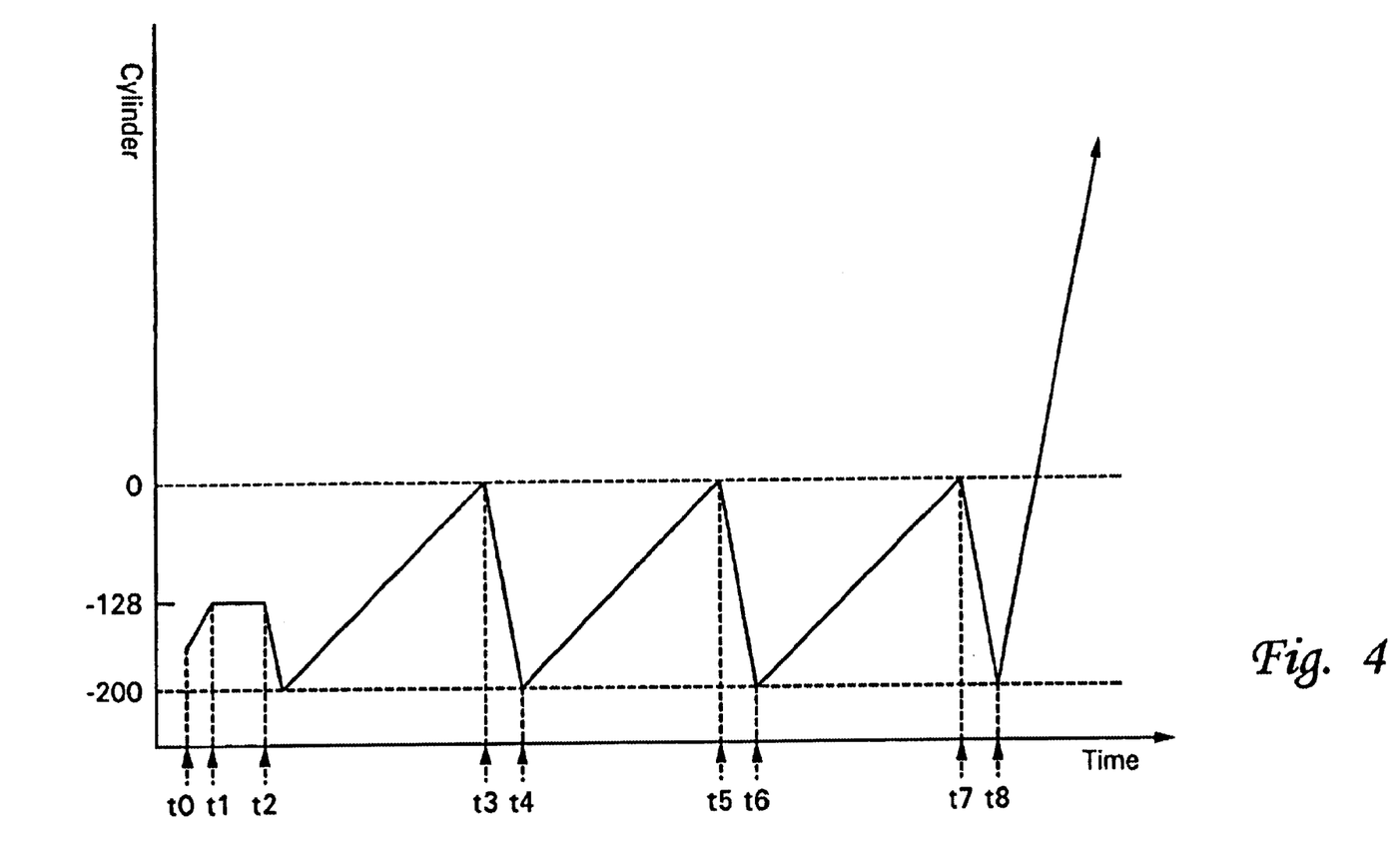
FIG. 4 is a graph showing time functions representing locations of cylinders which a head trails by the control method described deployed in accordance with one embodiment of the present invention.

FIG. 4 is a graph showing functions representing locations of cylinders which head 3 trails by said control. If reading a servo pattern is successful at time t0, start seek on −128 cylinder, and retain this head position for a specific period from time t1 to time t2. After this, perform seek on −200 cylinder, then gently move to 0 cylinder. After this, quickly move to −200 cylinder and perform a first sweep off operation. A time required for control to reach −200 cylinder is t4. The same operation is furthermore repeated twice, the usual control is started from time t8.

According to the hard disk unit and control method described in the embodiment for carrying out the invention, much contamination adhered on head 3 can be removed by track following for a specific period in an initial stage of head loading. Because the track following in an initial stage of loading is performed in peripheral areas on the disk, a problem of data loss caused by contamination can also be prevented from being rubbed. In addition, sweeping contamination off to outer circuits of the disk by a head sweep off operation in peripheral areas on the disk and moreover, more effective contamination removal from head 3 by a vibration in a horizontal direction can be expected.

The particular cylinder numbers, cylinder increment values that determine speed of moving toward inner or outer circuits, and repeating times of sweep off operations are only examples. The fact that said values can appropriately be changed according to conditions such as a time required for one-time seek is well known by the person skilled in the art.

Figure 5:
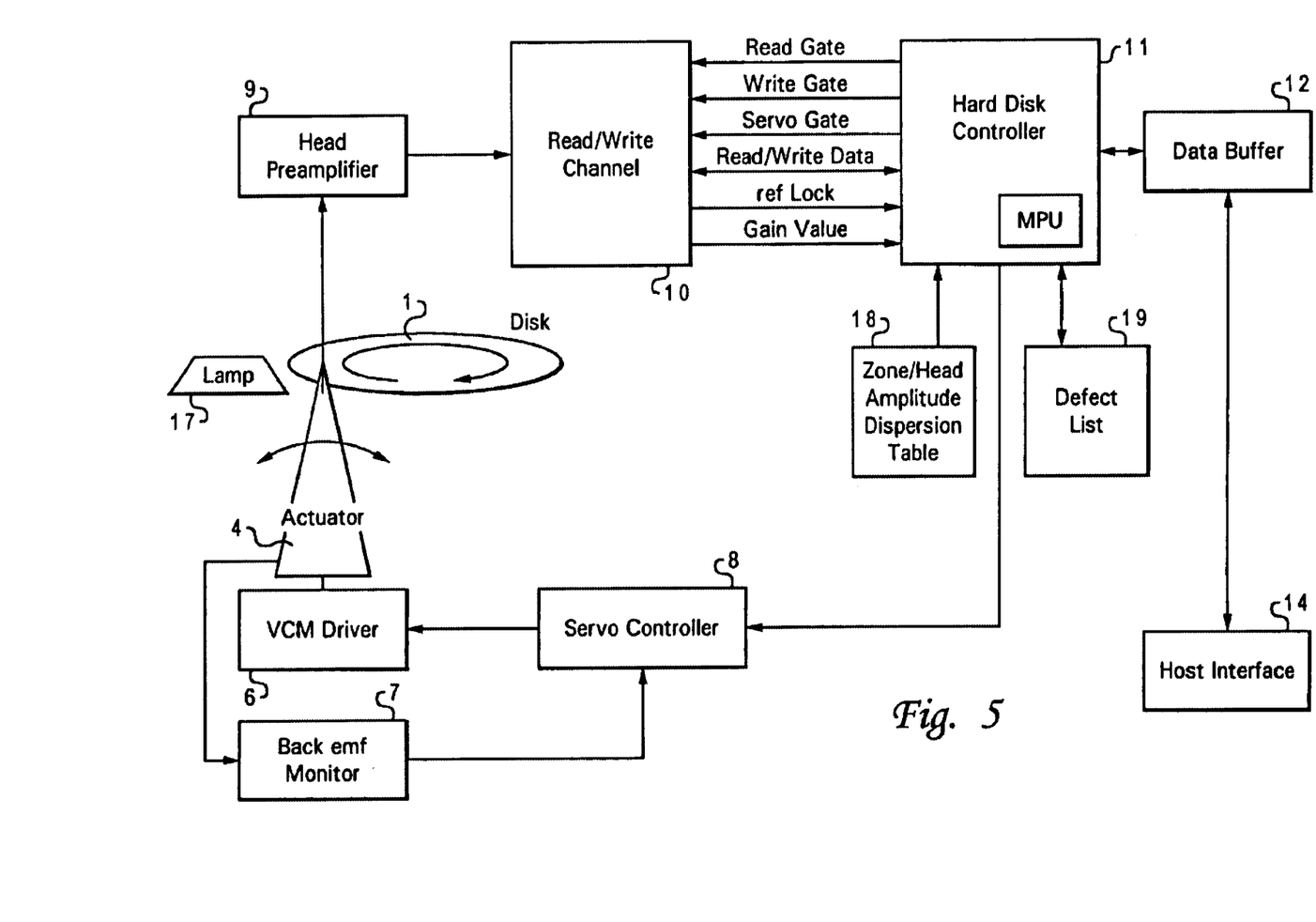
FIG. 5 is a block diagram depicting a hard disk in accordance with an alternate embodiment of the present invention.
Figure 6:
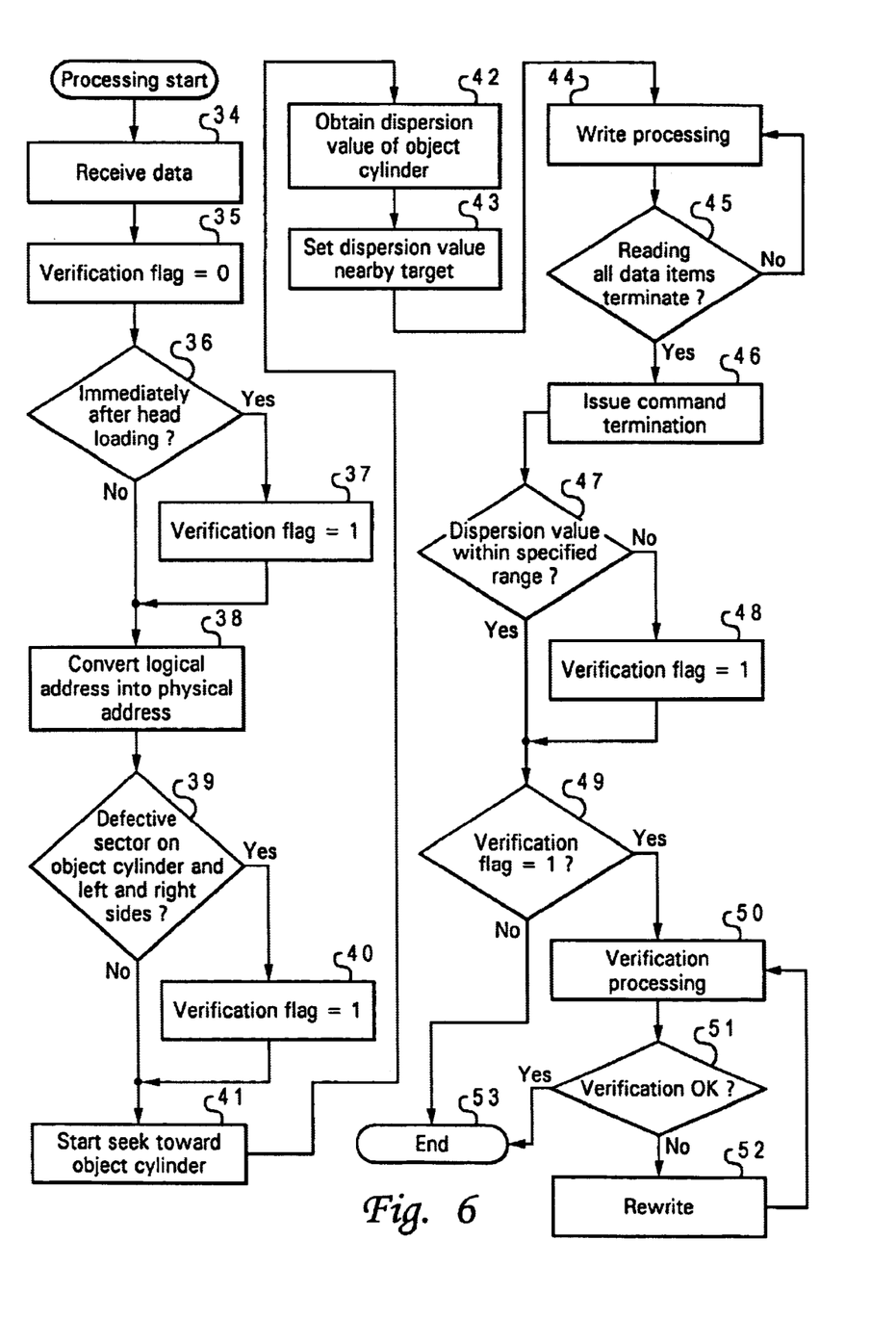
FIG. 6 is a flowchart illustrating an exemplary hard disk control method in accordance with one embodiment of the present invention.

FIG. 5 is a block diagram showing an example of a hard disk unit as another embodiment for carrying out the invention. The overview of the hard disk unit of the embodiments of the invention is the same as that shown in FIG. 1. However, as shown in FIG. 5, the hard disk unit of this embodiment for carrying out the invention comprises per-zone base amplitude dispersion table 12b and defect list 12c. In addition, data buffer 12a is one of functions described as the RAM 12 functions of the embodiment for carrying out the invention. Dispersion table 12b and defect list 12c are read from disk 1 and stored in RAM 12. In addition, an example of table 12b and defect list 12c stored on disk 1 is shown here, but these tables need not always be stored on disk 1. For example, the tables can be stored in a semiconductor nonvolatile memory in the hard disk unit.

Dispersion table 12b stores dispersions of signal amplitudes from head 3 for individual zones created by dividing the surface of disk 1 into concentric circle shapes. Signal amplitudes are obtained from gain values of the automatic gain circuit mounted in read/write channel 10. A signal from head 3 is amplified by head preamplifier 9 and input to read/write channel 10. The signal has a certain level of amplitude dispersion. Read/write channel 10 uses the automatic gain circuit to adjust a signal level before analog to digital conversion. A signal amplitude can be known by measuring a gain value of the automatic gain circuit, and dispersion of a signal amplitude can be seized from a dispersion of the signal amplitude. The dispersion can be represented by widths of the mean value, maximum value and minimum value of the amplitude. Because the dispersion values depend on a diameter direction of disk 1, a dispersion value per zone divided into a concentric circle shape is stored into a table. Such a dispersion table can be referenced for a control that will be described later.

Defect list 12c registers sectors judged to be defective by inspection at shipment from the factory or sectors assumed to be defective around a defective sector. The reason why the sectors around the defective sector are registered beforehand is because growth of the defect is expected. Sectors judged to be defective during use are additionally registered from time to time into the defect list used as a secondary table. Such a defect list can be referenced for a control that will be described herein below.

FIG. 7 is a flowchart showing an example of a control method for the hard disk unit described in said embodiments for carrying out the invention.

Data is received from host device 16 after processing is started (Step 34). The case in which a write command is received as data is considered here. Next, set the verification flag to "0". The verification flag indicates whether verification is required after write processing, and when it is set to "1", verification is required.

Next, the process determines whether the processing time of the write command is immediately after head loading (Step 36). Whether it is immediately after head loading is determined by, for example, using an internal clock to determine whether a specific period has been passed from the time of head loading or by using an appropriate counter to determine whether the specific number of commands are processed. For example, if a certain period has been passed, the process sets a time of few seconds (for example, less than 10 seconds, about 5 seconds) and determines whether the set time has been passed. If not, the process sets the verification flag to "1" (Step 37). If the time has been passed, the process proceeds to Step 38.

The flight of head 3 is unstable immediately after head loading, then a command may be executed while a flight height is high. If write processing is performed in such a condition, normal write often fails. These findings are based on results of experiments and studies of the inventors. Therefore, verify process is performed immediately after loading as described later.

Next, the process converts a logical address contained in received data into a physical address (Step 38). Physical addresses are specified by cylinders, heads, and sectors. Because the target cylinder can be known, refer to the defect list 12c in this stage to judge whether there is any defective sector nearby the target cylinder (Step 39). As a concept of "nearby", assume that cylinders up to a cylinder in a distance corresponding to few tracks. Desirably, "nearby" shall mean adjacent. If a cylinder adjacent to or nearby the target cylinder contains a defective sector, the process sets the verification flag to "1" (Step 40). If not, the process proceeds to Step 41.

A defective sector generally exists as a protrusion on a disk surface or a magnetized film peeling off a defective section exists as a convex. If head 3 collides against such a protrusion, the head rises high. Even if head 3 does not collide, disturbance of air current caused by a rotation of disk 1 raises head 3 high. Such rise of the head causes a write error as said. Therefore, verification is also required even when the head flies around a defective sector.

Next, the process starts seek toward a target cylinder (Step 41) and obtain a dispersion value of a zone containing the target cylinder from table 12b (Step 42).

Next, when seek nearly reaches the target cylinder, a dispersion value of a signal amplitude of head 3 (Step 43) is measured. As aforementioned, a dispersion value can be obtained by using automatic gain circuit of the read/write channel. Recently, a gain value is output as an output of a read/write channel. This function can be used as is. A dispersion value can be measured by, for example, storing the maximum and minimum values of a signal at reading a gray code per servo pattern nearby the target (write object sector).

Then, when head 3 reaches the target sector, hard disk controller 11 raises a write gate and writes write data onto disk 1 (Step 44). The process determines whether all data items have been written (Step 45). If not, the process reverts to Step 44 and retry the processing. If the data items are written, the process issues a command termination status (Step 46).

In this stage, the process compares the obtained dispersion value (difference between the maximum value and minimum value) to a dispersion value stored in the table and judge whether the value is within the scheduled range (Step 47). For example, if the obtained dispersion value exceeds the dispersion value stored in the table for 40 percent, the obtained dispersion value is determined to be outside the range. If it is outside the range, the verification flag is set to "1". The condition under which the dispersion value is determined to be outside the range is the condition where the head height greatly varies. Under such condition, a write operation is performed with high possibility while the head height is high, then the verification is required.

Next, the process determines whether the verification flag is set to "1". If the flag is "1", the process perform verify processing (Step 50). The verification procedure may be carried out by referring to an error code (ECC) to see if it is identical. The process determines whether the error code is identical (Step 51), and if it is, the process terminate processing (Step 53). If not, the process retries write processing (Step 52). After this, the process performs verify processing again, and repeats this processing until no problem arises. On the other hand, if verification is not required (verification flag=0) in Step 49, the process terminates processing (Step 53).

According to the hard disk unit and control method according to Example 2 of the invention, perform write processing after judging whether loading has just been ended, whether write is done onto nearby a defect, and whether write is done while the head flies in a stable sate. Experimentally, write in such state often terminates with an error so perform verification. In other cases, do not perform verification. Even if verification is performed in the said state, it is 1 percent or less of entire processing according to the study of the inventors. Therefore, the processing reliability of the hard disk unit can be improved by reducing write errors without deteriorating the performance of the hard disk unit.

In addition, whether above mentioned loading has just been done, whether write is done on nearby a defect, and whether write is done while the head is in a stable flight state are desirably all determined. However, one of these items or any arbitrary combination of them may be written and verified.

Herein above, the invention by the inventors has concretely been described based on examples of the invention, however, the present invention is not limited to the above described examples and various modification may be possible without departing from the scope and spirit of the present invention. For example, the voice coil motor (VCM) was provided as an example in the embodiment, however, another motor or actuator may be used.

The hard disk unit was also given as an example of a rotating storage device in the embodiment. However, application of the invention is not limited to the hard disk unit, but also applicable to a storage device with a rotating storage medium such as CD-R/W, DVD, and re-writable optical or optical-magnetic MO storage device such as a MO storage device. For example, the present invention may be also applicable to removable rotating magnetic storage devices such as a ZIP device and floppy disk device.

Effects given by representative features included in the invention disclosed by the application are as follows. Contamination can be removed without generating new contamination by contacting a head and a disk. Even if there is a defect, the reliability of write around the defect is improved, and a storage surface of a magnetic disk medium can most effectively be used. The write reliability can be improved without deteriorating the performance of a write operation.

What is claimed is:

1. A method for controlling a rotating storage device, wherein said rotating storage device includes a storage medium driven to rotate, a read/write head for reading/ writing information on said storage medium and a ramped loading mechanism in which said read/write head is stored, said method comprising:

loading said read/write head from said ramped loading mechanism onto said storage medium;

reading location information stored in said storage medium via said read/write head;

retaining a location of said read/write head for a predetermined period above a track of a region other than a valid storage region of said storage medium after succeeding of reading of said location information;

moving said read/write head to an inside of said storage medium; and     moving said read/write head to an outside of said storage medium, wherein a speed of moving to said outside is greater than a speed of moving to said inside.

2. The method of claim 1, wherein said track is positioned so that an air bearing surface (ABS) of said read/write head does not hang over said valid storage area.

3. The method of claim 1, wherein a combination of said moving to said inside and said moving to said outside is repeated for several times.

4. A rotating storage device comprising:

a head to read and write information from and to a storage medium;

a ramped loading mechanism for loading said head on said storage medium and for retaining said head;

means for reading position information stored in said storage medium through said head and for controlling said head at a relative location over said storage medium     means for retaining a position of said head above a track of an area other than a valid storage area on said storage medium for a certain period;

means for moving said head to an inside of said storage medium; and     means moving said head to an outside of said storage medium at a greater speed than that of moving said head to inside.

5. The rotating storage device of claim 4, wherein said track is positioned so that an air bearing surface (ABS) does not hang over said valid storage area.

6. The rotating storage device of claim 4, wherein said rotating storage device further includes     means for repeating said moving to said inside and said outside.

* * * * *